March 3, 1959 J. D. SKELTON ET AL 2,876,428
SEISMIC SECTION PRINTER
Filed Feb. 7, 1956 4 Sheets-Sheet 2

Jesse D. Skelton
Henry B. Ferguson
Inventors

By W. O. T Heilman Attorney

Jesse D. Skelton
Henry B. Ferguson    Inventors

Jesse D. Skelton
Henry B. Ferguson

United States Patent Office 2,876,428
Patented Mar. 3, 1959

2,876,428

SEISMIC SECTION PRINTER

Jesse D. Skelton and Henry B. Ferguson, Tulsa, Okla., assignors, by mesne assignments, to Jersey Production Research Company Application February 7, 1956, Serial No. 563,969

12 Claims. (Cl. 340—15)

The present invention is generally concerned with seismic records and especially with the corrections that are made in interpreting such records. More particularly, the invention relates to a seismic prospecting apparatus and method for preparing a seismic section from a plurality of reproducible type seismic trace records wherein the various seismic corrections, including both static or fixed corrections and variable or dynamic corrections, are automatically entered within the section. The invention is especially concerned with the preparation of a corrected variable density type seismic section from uncorrected seismic records of the magnetic trace type.

The general procedure of seismography is a technique that has by now become widely employed in the art and especially in the field of seismic prospecting. Briefly, the procedure consists of imparting a seismic shock to the earth at a given point (the shot point) and thereafter detecting the seismic disturbances that are created as a result of the shock at spaced distances from the shot point.

The disturbances generated at the shot point are shock waves that are transmitted from the point of the shock both directly and indirectly as by reflections from subterranean strata to the spaced detector points. By measuring the periods of time (i. e. the travel times) that elapse between the initial shot and the occurrence of the reflected disturbances at the spaced detectors, it is possible to ascertain the structure and location of subterranean strata at points intermediate the shot point and the detectors. It will be appreciated that certain corrections have to be made in these measurements to determine the depths of the subterranean strata as, for example, to allow for the various distances that exist between the detector points and the shot point. Other corrections, which are well known in the art, originate with the existence of the so-called low velocity layer, the elevation of the shot with respect to an assumed datum level, the elevation of the geophones or detectors with respect to the datum, etc. These corrections and an improved means for making them are considered at length later in this description.

The type of shock that is generally employed for use in seismology and especially in seismic prospecting is propagated by a shot or charge of explosive which may be detonated at the surface of the earth or slightly above or below the surface of the earth. The shot or charge is governed as to its size and location largely by the topography and the nature of the general area under investigation.

The detectors generally employed for detecting and measuring the disturbances that are created at spaced points from a shot point are transducers or geophones which are capable of generating electrical signals in response to the seismic energy which is imparted to them by the disturbances. The resulting electrical signals are transmitted by suitable electrical circuits to a recording device which is adapted to determine the magnitude of the disturbances and also the periods of time that elapse between the shot and the reception of the disturbances at the transducers or geophones.

Several different types of recorders are used in the petroleum industry for recording the signals that are generated by geophones. These recorders operate on a number of different principles including photographic and electrical. The type of recorder which is of particular interest to the present invention, however, is the type which employs a magnetic record medium such as magnetic tape, magnetic discs, magnetic wire or the like. Magnetic records as such are in themselves well known in the art and act to convert the electrical signals that are received from geophones into magnetic traces. Briefly, each geophone is connected to a separate magnetic head; and each head is moved relative to a magnetizable medium to create a magnetic trace on the medium that is essentially a record of the strength and nature of the signal. As mentioned above, the magnetic or magnetizable medium may be wire or tape, although tape is preferred for the purposes of the invention.

Tapes that are conventionally employed by the industry at the present time are usually synthetic films covered with a layer of an iron oxide, and they are capable of simultaneously recording up to thirty or more channels of information in a side-by-side relationship. Tapes and recorders are in themselves well known in the art, and it is therefore not considered necessary to enter into a lengthy discussion of their construction or operation in this description. It will be noted, however, that in the description which follows, it will be considered that the records being processed are of the magnetic tape type.

After a magnetic tape recording of geophone signals has been made, it is necessary in utilizing the record on the tape to critically observe each of the magnetic traces for manifestations of reflected disturbances. It is further necessary to correct these records for the errors that are introduced within them by the existence of the low velocity layer, elevation changes, the spread between the shot point and the geophone locations, etc. In any given area, the so-called fixed or static corrections such as those occasioned by the low velocity layer, elevation, and the like are substantially identical at all depths for any single geophone trace. The dynamic or variable corrections on the other hand vary along the length of each trace. For example, in correcting a trace for the spread between its geophone and the shot point, it is necessary to apply a different amount of correction to each point along the length of the trace.

At this point it is well to note that it is the usual practice in the art of seismic prospecting to mathematically correct original or raw seismic records in a manner such that the shot point and each one of the geophone locations in any given observation in effect is moved in a vertical direction to an assumed datum level. The position of all reflections in the records are then determined relative to this datum.

Since the velocity of sound plays an important part in the interpretation and correction of seismic records, it is necessary to assume or actually determine the sonic characteristics of a region which is under investigation. Since the velocity of sound through the earth very often differs greatly in any given region depending upon the nature and the depth of the formations in the region, it is generally desirable to have actual velocity information on the region rather than assumed information. Actual information may be obtained, for example, by any one of several well-known logging procedures.

It is also eminently desirable and virtually necessary to directly or indirectly produce seismic records which are susceptible of visual investigation. Accordingly, in the past, the methods and apparatus that have been employed in seismic prospecting have been of a type that produce records which are more or less visual in character. More recently, however, it has been the trend in the art to manufacture records which are reproducible in character in that the records may be played back repeatedly. Unfortunately these reproducible-type records are for the most part not susceptible of direct visual study, and it is necessary to convert the records to some visual form before they can be readily studied and interpreted.

In correcting seismic records that are obtained in the field, it has been conventional practice to prepare seismic sections which essentially are composites of the original records but which have been corrected for the various errors mentioned earlier in this discussion. The sections in most instances are prepared by merely making an artist's drawing of a cross-section of the earth in pen and ink and thereafter incorporating within such a drawing the data that are obtained from correcting the original seismic records. Furthermore, it is customary, due to the complicated and lengthy mathematical procedures involved, to merely average all of the results that are obtained from the geophones in any given seismic observation and to present these results as a single point on a section which incorporates a plurality of such observations. Thus, the amount of information which is actually presented in a seismic section is generally far less than was actually obtained in the original records. Furthermore, the final product is subject to a large extent to the interpreter's personal opinion and judgment as to what the original records tell.

Having briefly discussed the present state of the art and in particular the shortcomings of the art, it is an objective of the present invention to afford an improved means for preparing corrected seismic sections from original seismic records. It is a further objective of the invention to afford an apparatus and procedure for preparing a corrected, visual-type seismic section in which every available original recording or trace may be reproduced and represented in the section. It is further a particular object to afford a procedure and apparatus for preparing a seismic section wherein the various seismic corrections are automatically entered when transposing from the original records to the seismic section. It is also a particular object of the invention to prepare a seismic section which is of the variable density type and especially of the photographic variety.

In connection with the last-named objective of the invention, it is desirable at this point in the description to define the term "variable density." This term, as employed hereinafter, is intended to include or designate seismic traces which are generally characterized by possessing a substantially constant width and a variable intensity or density which is proportional to the amplitude of the signal recorded. Traces of this type may be photographic in nature such as are described in U. S. Patent 2,051,153 of Frank Rieber. The traces may also be of a magnetic type wherein the traces are of substantially constant width but variable in their magnetic intensity. Traces may also be variable in their color as will be readily apparent to persons skilled in the art. The invention, however, is especially directed toward the preparation of variable density seismic sections of the photographic type, since sections of this type lend themselves to very ready and graphic presentation and interpretation.

The above and related objectives of the invention are attained by employing an apparatus and procedure for receiving reproducible uncorrected seismic records and for converting and assembling these records into a corrected seismic section. It is a further objective of the invention to provide an apparatus and procedure for converting reproducible uncorrected seismic records into a corrected visual type section. It is a particular object of the invention to convert uncorrected seismic records of the variable density magnetic type into a corrected visual section of the variable density type.

As mentioned above, the invention has particular application to various types of magnetic records including records on wires, reels, discs and the like; but it is especially well suited for use with tape-type records. The invention is particularly characterized by an apparatus and procedure in which each trace in a set of original magnetic records is reproduced and corrected for both static or fixed and dynamic or variable errors and is thereafter transposed and assembled in the form of a visual type seismic section. The various corrections are entered within the final seismic section with the aid of an analog computer which corrects the transposed information from each original trace for the errors that are occasioned by the spread between the shot point and the geophone producing the signal for the trace.

The invention may be better understood by reference to the attached figures wherein.

Figure 1:
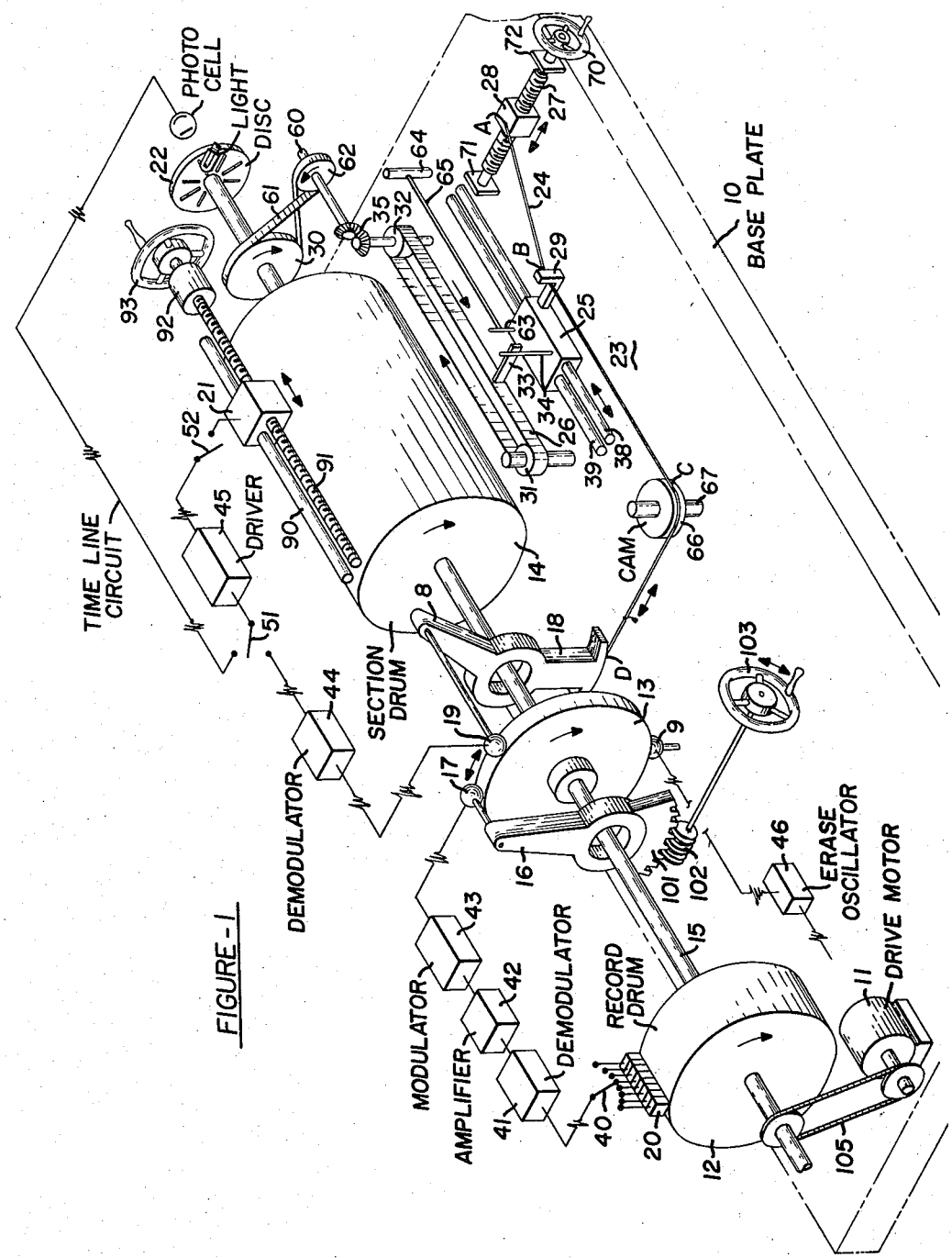
Figure 1 is a perspective view of an apparatus which employs a preferred embodiment of the invention.
Figure 2:
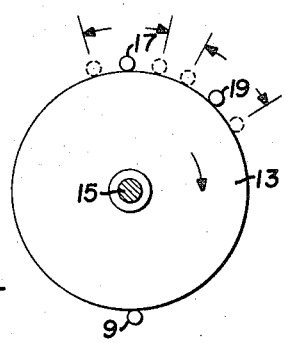
Figure 2 is a side view of the correction drum illustrated in Figure 1.

Referring first to Figure 1, it will be seen that the apparatus illustrated there includes a number of mechanical components as well as electrical components. Among the mechanical components are included a base plate 10 which is shown in faint outline; drive motor 11; record drum 12; correction drum 13; section drum 14; shaft 15; static correction arm 16 including a recording head 17; dynamic correction arm 18 including a pickup head 19; playback heads 20; section recording means 21; time line generating means 22; and spread correction mechanism 23. The last named mechanism—i. e. the spread correction mechanism—includes spread correction tape 24; traveling block 25; drive belt 26; spread correction screw 27; and spread correction head 28.

Among the electrical components in Figure 1 are included selector switch 40; demodulator 41; seismic amplifier 42; modulator 43; demodulator 44; driver 45 and erase oscillator 46.

Having briefly enumerated the various mechanical and electrical components in the apparatus of Figure 1, attention is now directed toward a more detailed consideration of the physical relationship of the various mechanical components relative to one another. In considering these components, it is essential to note that a number of structural parts have been omitted from the figure in order to simplify the figure and to render it easier to understand. Thus, some of the structural members which are obviously necessary to support the various mechanical components have been omitted from the drawing, since the necessity and nature of these components will be readily apparent to persons skilled in the art. Furthermore, wherever it is felt to be desirable, reference is made in the following description to the existence of structural members where these members are missing from the drawing.

Turning back to Figure 1, now, it will be noted that record drum 12, correction drum 13, section drum 14 and sheave 30, are all keyed directly to shaft 15 and are driven in the same rotary direction. Arrows drawn on these members indicate the direction of rotation.

Also supported from shaft 15—but free to rotate with respect to the shaft—are static correction arm 16 and dynamic spread correction arm 18. These two arms—as illustrated in the figure—appear to be suspended in space, but it will be understood that suitable bearings such as roller bearings or the like are positioned between these arms and shaft 15 to permit ready and free movement therebetween.

It will further be recognized that shaft 15 is itself supported from base plate 10 by means of suitable upright members in conjunction with two or more bearings. For the present it will be assumed that shaft 15 is one continuous shaft; but it will be obvious as brought out hereinafter that the shaft can actually be divided into at least two separate shafts so long as synchronism between the movements of the individual shafts and the attached drums is maintained.

Drive belt 26 is illustrated as being driven around two spaced pulley members 31 and 32. The pulley members are secured to vertically rotatable shafts which in turn are supported as by means of suitable bearing members not shown from base plate 10. The vertical shaft which supports pulley member 32 is provided at its upper end with a bevel gear that meshes with a second bevel gear which in turn is secured to horizontally disposed shaft 60. Shaft 60 is rotated or driven from sheave 30 on shaft 15 by means of a twisted belt 61 which drives a sheave 62 on shaft 60. It will be particularly noted that belt 61 is twisted or reversed so that sheaves 30 and 62 rotate in opposite directions relative to one another. Furthermore, sheave 30 is sized such that it rotates once for every two revolutions of belt 26.

Secured at one point along the outer surface of drive belt 26 is a drive arm 33 which extends out from the belt and engages an upright rod 34 which is secured in turn to traveling block 25. The traveling block, the upright rod, the drive arm and the drive belt are arranged relative to one another such that the arm engages the rod during travel of the belt from sheave member 32 to 31.

Traveling block 25, as indicated in the figure, is supported by and moves freely and longitudinally along two guide members 38 and 39. Block 25 may conveniently be provided with two holes through its length to receive the guide members and to permit support of the block by the guide members. With respect to the guide members themselves, it will be understood that these members are supported from base plate 10 by suitable means not illustrated in the figure. In order that block 25 may move substantially the entire length of the two guide members, however, it will be apparent that the supporting members for the guide members should be disposed near each end of the guide members.

Also provided on block 25 is a second vertical or upright rod 63 which is connected to still another upright rod 64 by means of an elastic member 65 which continually attempts to draw the traveling block 25 in the direction of the rod member 64. The latter rod may be anchored in a conventional manner to base plate 10.

Thus, to review momentarily, traveling block 25 is continually moved from one end of the guide members 38 and 39 to the opposite end of these members by the alternate action of the arm 33 against the rod 34 and the action of the elastic member 65 with respect to the rod 63. The arm 33 drives the traveling block along the guide members 38 and 39 until it moves around sheave 31 and returns to sheave 32. As the arm 33 moves around the former sheave, it disengages itself from rod 34; and elastic member 65 then urges and returns the traveling block toward the ends of the guide members 38 and 39 that are disposed toward the sheave 32.

Still another member which is attached to traveling block 25 is horizontally disposed tape arm 29 which lies at substantially right angles to the guide members 38 and 39. This member extends outward from the block and is provided with a peg or hook arrangement which is adapted to engage spread correction tape 24. Arm 29 is not rigidly connected to tape 24 but instead is arranged to provide relative motion between it and the tape. Thus, as traveling block 25 moves along guide members 38 and 39, arm 29 similarly moves along a portion of the length of the tape 24. At this point it will be noted that the length of travel of the traveling block 25 along the guide members 38 and 39 (and similarly the length of travel of the arm 29 along the tape 24) is related to the length of the record traces which exist on record drum 12 as well as the traces that are formed on the section drum 14. The relationship between these various members will become clearer later in this description.

Referring now to the spread correction tape 24, it will be seen that this tape at one end tangentially engages the dynamic correction arm 18 and at its other end engages the movable block 28. At one point between its two ends, the tape slidably engages arm 29 and at another point it slidably engages rotating speed correction cam 66. Cam 66 is secured to vertical shaft 67 which in turn is rotated and driven by means not illustrated in order to simplify the figure. It is desirable, however, that cam 66 as it is illustrated in Figure 1 be arranged to make one complete revolution for every complete revolution of the tape driving arm 33 along the periphery of the drive belt 26. As illustrated in Figure 1, cam 66 is depicted as a simple circular cam as would be the case when a single velocity for sound exists or is assumed to exist in a region. As will be brought out later in this description, this cam may have a profile adapted to enter corrections in the seismic sections produced that compensate for variations in the speed of seismic waves through various subterranean strata. The nature of the contour of cam 66 in such a situation will be readily apparent to those skilled in the art.

As previously mentioned, one end of tape 24 is secured to movable block 28 which is moved along the length of screw member 27 in response to rotation of the screw member as by means of crank 70. Screw member 27 is supported at each end as by means of vertical bearing plates 71 and 72 in turn are secured to base plate 10. The screw member is free to turn within bearing plates 71 and 72; and accordingly, rotation of the crank 70 causes block 28 to move along the length of the screw member. With respect to the block 28, it is essential that the block moves along the screw member in a direction such that the end A of the tape 24 moves at right angles to the portion of the tape which extends between point C on the periphery of cam 66 and point B on the arm 29. It is also essential that point A lie vertically above the axis of screw member 27 and that this point as well as points B, C and D lie in the same horizontal plane.

The apparatus in Figure 1 is of a type in which drums 12, 13 and 14 are of substantially equal diameter; and the corrected traces formed on drum 14 are substantially equal in length to those on drum 12 except, of course, for the corrections entered on drum 13. The length of arm 18 is equal to that of arm 8, and the lower surface of arm 18 is an arc of a circle whose center lies on the center line of shaft 15. Tape 24 is secured at one end to the arc of the circle such that a tug on the tape in the direction toward points C and D causes arm 18 to move radially around and counter to shaft 15. Release of the tugging force may be arranged to cause movement of arm 18 in the opposite direction as by use of springs or the like. The end of tape 24 must be connected to the arc portion of arm 18 such that the tape always contacts the arc in a tangential manner. The point of contact is actually point D. Thus, in the apparatus of the figure, the circumferential movement of head 19 is made equal in magnitude to the linear displacement of tape 24 between points C and D.

Figure 3:
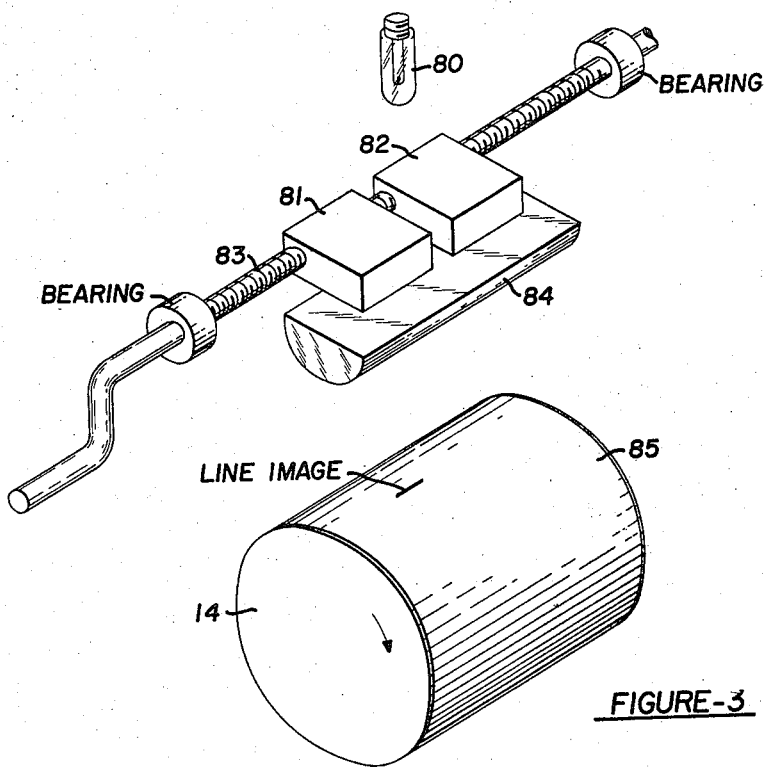
Figure 3 illustrates in vertical cross-section a schematic view of a projection device which is suitable for use when preparing a variable density photographic type section.

Turning next to the projection or recording means 21, it will be recalled that this device must be of a character to produce records of the type desired on the section drum 14. For example, the projection device may be a conventional pen oscillograph when the records desired are of the conventional cartesian type, or it may be a magnetic head if the records desired are of the magnetic trace type. As stated earlier, however, it is a particular object of the present invention to produce visual records and especially visual records of the variable density photographic type. Accordingly, projection means 21 is preferably a variable-density-type light projection device such as is illustrated schematically in Figure 3. Turning to Figure 3 momentarily, a suitable device includes a lamp 80, a pair of movable blocks 81 and 82, an adjusting screw 83, cylindrical lens 84, and photographic film 85. The adjustable blocks and the lens are arranged relative to the lamp and the film such that light emitted by the lamp passes through an opening between the blocks and is impinged upon lens 84. Lens 84 then focuses the light beam to form a line image on the film 85. The lamp is preferably of a type whose intensity of illumination is directly related to the amplitude of the signal fed to the lamp. An example of such a lamp is Model 1B59/R–1130B manufactured by Sylvania Electric Products, Inc.

The lens lies at right angles to the width or opening of the slit between blocks 81 and 82 and also at right angles to the direction of movement of film 85. Thus, the line image on the film is also at right angles to the direction of travel of film 85. Film 85 in the apparatus of Figure 1 is mounted on section drum 14. The screw 83 and the blocks 81 and 82 are threaded such that cranking the screw in one direction moves the blocks apart, while cranking in the opposite direction moves them together.

The entire projection device of Figure 3 is represented by the box-like member 21 in Figure 1. This member, which is necessarily light-tight, is mounted upon guide rod 90 and drive screw 91. Guide rod 90 and drive screw 91 extend the entire length of the section drum 14 and are supported directly or indirectly from the base plate 10. The drive screw is further provided with suitable means for rotating the drive screw relative to the projection device. By being suitably threaded the projection device, upon rotation of the drive screw, moves longitudinally along the length of the screw. A practical arrangement for attaining this objective is shown in the figure and includes a bearing member 92 and a hand wheel 93. Bearing 92 and one or more other bearings, not shown, may be employed to support the drive screw; and rotation of the hand wheel 93, which as shown is manually operative, causes projection device 21 to move along the length of the screw.

It will be apparent that the above arrangement makes it possible (1) to place a plurality of photographic traces in a side-by-side relation on a film on drum 14, and (2) to vary the width of the individual traces. These features in turn make it possible to make a seismic section on drum 14 which is scaled or proportional laterally to the actual distances that exist between geophones or seismic detectors in the field. In other words, the geophone traces that are recorded on drum 14 may be spaced from one another a distance which is directly proportional to the distances that exist in the field between the geophones that generated the traces. To facilitate the proportioning operation, it is therefore desirable to calibrate the screw 91 and the hand wheel 93 in a manner such that every turn of the screw represents a certain actual distance in feet, miles or the like. At this point it is well to note that seismic sections, as they are conventionally produced in the art, are generally arranged such that horizontal distances are expressed in terms of feet, while vertical distances are expressed in terms of time. It will be apparent, however, that the apparatus of Figure 1 may be readily adapted to any suitable set of coordinates, it being necessary merely to properly calibrate the various adjustments and adjusting devices that are employed in the apparatus.

When the recording medium on section drum 14 is of a light sensitive type such as a photographic film, it will be recognized that it is essential that only desired portions of the medium be exposed to light at any one time. Accordingly, it will be necessary to maintain this portion of the apparatus in a light tight or relatively dark space. Conveniently, drum 14 may be mounted within a light-tight container or shield which is provided along its length with a slit arranged to accommodate movements of the projection device 21. Arrangements of this type will be readily apparent to persons skilled in the art, and it is not considered necessary in the present description to enter into a detailed discussion of such a feature.

As mentioned earlier, a static correction arm 16 with an attached recording head 17 is movably mounted on shaft 15 in a position such that the recording head lies immediately adjacent the cylindrical surface of the correction drum 13. Arm 16 in essence is the radius of a circle whose center lies along the center line of the shaft 15; and accordingly, movement of the arm causes head 17 to move along the periphery of the drum 13.

Arm 16 is provided with means suitable for moving it in the manner just described. Thus, as illustrated in Figure 1, the arm is connected to the quadrant of a gear 101 which is meshed with a static correction screw 102. As further illustrated, the center of gear 101 lies along the center line of shaft 15, the radius of the gear being proportioned to the length of arm 16 and the dimensions of the screw 102 such that head 17 is moved along drum 13 distances which are consistent with the traces that are laid down or formed on the drum.

It will be apparent that static correction screw 102 and its driving hand wheel 103 must be mounted from base plate 10 in a manner such that the screw and the hand wheel may be moved in a rotational manner. A suitable supporting means will be readily apparent to persons skilled in the art. It will further be apparent that rotation of the hand wheel and the static correction screw causes corresponding movement of the head 17.

Having thus enumerated the major mechanical components of the apparatus embodiment depicted in Figure 1, attention is now directed toward a more detailed consideration of some of these components. For example, returning to the record drum 12, it is preferred that this drum be of a character such that magnetic tape seismic records may be mounted thereon. Such tapes are generally from about 1 to 4 inches wide and from about 20 to 50 inches long and generally contain about 15 to 50 channels of information. Each trace extends substantially the length of the tape and is essentially constant in width but variable in its density (i. e. its intensity of magnetization). The traces, as explained earlier, are imposed upon the tape by means of suitable electromagnetic heads which are powered by signals received from geophones, generally after suitable amplification, filtering and modulation. In most instances, bias recording, frequency modulation, or pulse-width modulation is employed to improve the characteristics of the records that are made upon the tape. For the purposes of the invention, pulse-width modulation is preferred since it has been established that this type of recording greatly minimizes noise signals and the like.

In addition to being of a diameter and width sufficient to receive magnetic tape seismic records, record drum 12 is preferably provided with a suitable means for mounting and holding the tape in position on the drum. The holding means should be of a type such that every tape of the same type which is placed on the drum is held in substantially an identical manner. As illustrated in the figure drum 12 is rotated by corresponding rotation of shaft 15. Shaft 15 in turn is illustrated as being rotated by drive motor 11 through a suitable power transmission device such as the endless belt 105. While a wide range of drum speeds is permissible and practicable, it is generally desirable that the drum rotate at a speed such that the records on the drum move past the playback heads 20 at a rate of about 3 to 10 inches per second.

It will be appreciated that the record drum 12 may actually be the same drum as was employed in the field to obtain the original magnetic tape records. For the sake of convenience, however, it is preferred that the drum be an entirely separate drum—used in conjunction solely with the remaining portions of the equipment in Figure 1. In this connection, it will be apparent then that the original record portion of the apparatus as represented by record drum 12 may be adapted to handle magnetic records of various types including wires and discs as well as other reproducible records such as the variable area and variable density types. It has been established, however, that magnetic tape records mounted on a drum such as drum 12 affords operating advantages which are unique and preferred for the purposes of the invention.

Referring next to the section drum 14 it will be observed that this drum as illustrated has substantially the same diameter as record drum 12 but a much greater length. The desirability of having a section drum of greater length than the record drum will be readily apparent when it is recalled that it is an objective of the invention to prepare sections of numerous records of the type that are mounted on the record drum. Furthermore, the section drum is also of a greater length than the record drum so that the recordings that are made on the section drum may be expanded or spaced as desired. Thus, the operator of the apparatus can separate the individual traces as they are transferred from the record drum to the section drum and can space them on the section drum in accordance with the distances which separate the geophones that were employed to produce the original records. The attractiveness of this provision will be readily apparent to those familiar with the preparation of seismic sections.

As explained earlier, it is a particular object of the invention to produce visual-type records on section drum 14. Accordingly, this drum must be capable of receiving and holding materials such as photographic film upon which visual records can be made. Thus, as discussed hereinbefore, in using photographic film the entire drum must be enclosed within a light proof box; or alternatively, it must be maintained within a darkened room. Adaptation of the apparatus to either one of these conditions will be readily apparent to persons skilled in the art.

For the purposes of the present description it will be assumed that section drum 14 is of a character adapted to retain a photographic film along its outer cylindrical surface. It will be further assumed that the film is of substantially the same length as the magnetic tape on record drum 12 and that it is sealed from extraneous light by means of a suitable enclosure not illustrated.

With respect to the diameter of section drum 14, it will be noted at this point that the drum may be of a different size than correction drum 13 and/or record drum 12. In order to simplify the description and explanation of the invention, however, it will be assumed that all of the drums have the same diameter. The use of drums having different diameters is possible as will become more apparent with the ensuing description.

Correction drum 13 is conveniently mounted between record drum 12 and section drum 14 and is provided along its periphery with a recording head 17, a pickup head 19 and an erase head 9. Rotation of the drum causes any given point on the periphery of the drum to move under the recording head, the pickup head, and the erase head in that order. This drum, like record drum 12, may be of a character adapted to hold a magnetic tape of predetermined length on its outer surface; or alternatively it may be a solid metal drum which is magnetizable along its periphery in the same manner as magnetic tape. For the sake of the present description, it will be assumed that the drum is of the latter type— i. e. a metal drum with a continuous magnetizable surface along its outer cylindrical periphery.

Having now set forth the major mechanical components of the apparatus in Figure 1 and having briefly indicated the characteristics of each component, attention is now directed toward the electrical components that are illustrated in the figure. First, it will be observed that each playback head in the bank of heads 20 adjacent the record drum 12 is connected to a demodulator 41 through selector switch 40. Thus, each trace on record drum 12 may be separately played back by placing selector switch 40 on the proper contact element leading to the playback head which is adapted to scan that particular trace.

In demodulator 41, the signal or record that has been played back from the record drum 12 is demodulated to recover and reproduce the original seismic signal. The resulting seismic signal is then transmitted by suitable circuitry to a seismic amplifier 42 for suitable amplification, filtering, automatic gain control, etc. The amplified signal is then modulated in modulator 43 and transmitted to the recording head 17 associated with correction drum 13. The trace recorded on drum 13 moves with rotation of the drum to a point under pickup head 19 which reproduces and transmits the signal or trace to demodulator 44 where it is again demodulated. The resulting demodulated seismic signal is then passed to a suitable driver 45 which generates a signal sufficient to actuate projection device 21. For example, in the case where the projection device 21 makes use of a variable intensity lamp such as described hereinbefore, driver 45 is selected so as to develop a signal sufficient in magnitude to actuate the lamp in the desired manner.

Immediately prior to driver 45 in the electrical system is positioned a suitable switch 51 which alternately connects either the demodulated signal from demodulator 44 or a time line signal from time line means 22 to the driver 45. A second switch 52 is included in the circuitry between the driver output and the projection device 21 in order to interrupt the signal to the latter device as desired.

Turning back momentarily to the correction drum 13, it will be observed that erase head 9 is electrically connected to an erase oscillator 46 which is adapted to provide a type of signal capable in effect of erasing any recorded trace on the correction drum. Conveniently, the erase oscillator may be a vacuum tube oscillator which generates an electrical signal of about 30,000 cycles per second. Signals of this type are conventionally employed in the art for the general purpose described.

Before entering into a description of the manner in which the apparatus of Figure 1 operates, it is considered desirable to point out that all of the adjustments, corrections and the like that are made by the various components of the apparatus must be such that the dimensions of all of the information that is incorporated in the section on drum 14 is properly scaled. Expressed otherwise, dynamic corrections such as are entered by the spread correcting mechanism 23 and static corrections such as are entered by the static correction screw 12 must be of a magnitude such that when they are transmitted to the section drum they are in proper proportional relation to the traces that are transmitted to this drum from record drum 12 and correction drum 13.

At this point it should be noted, as indicated earlier, that it is customary for persons skilled in the art to employ time values instead of linear measurements to indicate the positions vertically of strata beneath the surface of the earth. In other words seismic sections are generally prepared using time intervals expressed in seconds rather than distances expressed in feet as measuring sticks to indicate vertical distances. Thus, the various dynamic corrections and the various static corrections are expressed as time intervals rather than linear distances when incorporating these corrections in a seismic section.

In Figure 1 no means have been illustrated in the figure for indicating the magnitude of the adjustments or corrections that are incorporated in the seismic section on drum 14. In actual practice a number of devices may be employed for this purpose, and particularly suitable devices are mechanical counters. Thus, one counter can be used in conjunction with spread correction screw 27, another with static correction screw 102 and still another with drive screw 91 to indicate the magnitude of the adjustments that are produced by actuating these various members. The actual magnitude of the various adjustments will be governed to a great extent by the velocity of sound through the particular cross-section of the earth being studied. In general, it is usually assumed, without any great error that the velocity of sound in most areas is roughly constant throughout a section of the earth; and in these instances a circular velocity correction cam 66 may be employed. Where the velocity of sound differs substantially in passing from one stratum to another through a section of the earth, however, the contour of this cam can be properly cut as will be apparent to persons skilled in the art to correct or compensate for these variations in speed.

With these additional factors in mind, it is felt that a clearer understanding of the invention can now be obtained by briefly considering the manner in which the apparatus of Figure 1 is actually operated. First, a magnetic tape containing a plurality of side-by-side geophone signal traces is positioned upon and secured to the surface of the record drum 12. As will be apparent to those skilled in the art, such a tape represents or presents a type of record in which the geophone traces are arranged relative to one another in an arrival-time relationship. As will further be apparent to those skilled in the art, these records may consist of pure seismic signals or they may be of a type obtained by bias recording, pulse-width modulation, frequency modulation or the like of the pure seismic signals. For the purpose of the present description, it will be assumed that the various traces are all pulse-width modulated since records of this type have been found to possess unique advantages over other types of records.

Substantially all modern magnetic recorders that are used for recording geophone signals in seismic observations are operated at constant speed. Accordingly, it will be assumed in the present description that the records being corrected and transposed were obtained on a recorder of this type. It will further be assumed that the velocity of sound is constant throughout the records.

In substantially all seismic recording operations, it is conventional practice to employ one channel of each observation to indicate the time of the shot break and another channel to record a constant frequency time signal. The recording of the latter information affords the operator with positive data as to whether the recording apparatus operated at constant speed and also with an accurate measurement of the arrival times of the various signals that are registered in the traces generated by the geophones.

It is also substantially standard practice in the art to employ the shot break time as a reference or zero time for all of the other signals or observations that are obtained in a seismic observation. Furthermore, where a plurality of seismic observations are combined to form a seismic section, it is general practice to use a common datum level as the means for tying all of the different seismic observations to a common reference point. In other words, all of the shot locations and geophone locations are corrected with respect to an assumed datum elevation; and all traces are then aligned vertically after all corrections have been applied to them such that the points on the traces corresponding to this elevation are in horizontal alignment.

In addition to placing the magnetic tape containing the original uncorrected seismic traces on the record drum 12, a suitable photographic film is mounted upon the cylindrical surface of section drum 14 and aligned or synchronized with the tape on the record drum. Since the shot break time in each observation as explained above is employed as zero or reference time, the film on drum 14 and the tape on drum 12 are aligned such that the shot break point is picked up from correction drum 13 at substantially the same instant as the projection device 21 begins its travel along the length of the film on drum 14. This step of the overall operation may be performed in any one of several conventional manners. A simplifying procedure consists in using an automatic shooting procedure in the field in obtaining the original records. This technique makes it possible to have the shot break occur at the same point along the length of each magnetic tape record. By then calculating the corrections that are necessary to refer the shot break in each observation to the datum elevation mentioned earlier, the relative positions of the playback heads, the recording heads and projection device may be readily fixed and the various drums placed in proper alignment.

Having aligned the section drum, the correction drum, and the record drum, one of the traces is selected on the magnetic tape record for transposition and correction to the photographic film on section drum 14. A suitable datum elevation having been selected for all of the seismic records to be processed, the static correction screw 102 is adjusted so that record head 17 is spaced a short distance along the surface of drum 13 from pickup head 19. The distance should preferably be slightly greater than the maximum total static correction or deviation in the static corrections which is to be incorporated within the playback of any single trace in the whole set of original records. Relative to this point, it has been found that a spacing of these heads equivalent to a time interval of at least about 0.8 second for seismic traces of about 6 seconds duration each is sufficient for the purposes of the invention. In other words, the record which is put down on the correction drum by the recording head should remain on the correction drum for a period of time of sufficient duration such that the various movements of the recording head and the pickup head can be made for all of the traces involved without having the heads bump against one another. This provision or limitation will be readily apparent to persons skilled in the art. It will further be apparent that a delay time in the correction drum between the record head and the pickup head of at least 0.8 second will readily suffice for the study of virtually all presently conventional reflection type seismic prospecting observations.

Having sufficiently spaced the record head 17 and the pickup head 19 from one another, any dynamic corrections are incorporated within the apparatus by movement of head 19 relative to head 17 and also relative to the trace on the correction drum. This correction is made to each trace during the actual playback period rather than prior to the playback period such as is the case with the static corrections.

A spread correction correcting the trace on the record drum for the distance between the shot point and the geophone whose signal trace is being processed is entered into the apparatus by displacing point A of correction tape 24 at right angles to the portion of the tape lying between points C and B. Each trace on the record drum is preferably played back in a manner such that the shallow parts of the trace (i. e. the signals from the shallower formations) are played back first. These signals in each trace are the ones which are subject to the greatest spread errors.

As mentioned above, the spread correction for each trace is entered by displacement of point A on the spread correction tape in a direction perpendicular to the segment of the tape between points B and C. Assuming the perpendicular distance between point C and the longitudinal axis of spread correction screw 27 to be exactly proportional to the length of the entire trace which is to be placed upon the section drum 14, the degree of displacement of point A along the axis of screw 27 from the segment BC extended of the tape 24 must be proportional (in terms of time) to the spread between the shot point and the geophone location—when both are located at the datum level.

At this point it will be appreciated that arm 33 must engage rod 34 at the very instant that the pickup head 19 begins to remove the trace from correction drum 13 for transmission of the trace to the projection device 21. At this instant, of course, the traveling block 25 must be at the ends of the guide rods 38 and 39 that are located nearest to sheave 32.

As the pickup head 19 scans the trace on the correction drum 13, the traveling block simultaneously travels the length of the guide rods 38 and 39. Necessarily, the guide rods must be of a length such that the traveling block moves along these rods until the pickup head has completely scanned the entire length of the trace on the correction drum.

In examining the figure, it is apparent that tape 24 moves around cam 66 toward arm 18 as traveling block 25 moves from pulley 32 to pulley 31. Simultaneously, pickup head 19 moves away from recording head 17. In other words, each trace on drum 12 is progressively distorted along its length, as it is transposed through drum 13 to drum 14—the maximum distortion occurring at the point on the tape corresponding to the shallow end of the tape. That this systematic distortion of each trace in moving from drum 12 through drum 13 to drum 14 is equivalent to correcting the trace for spread errors will be apparent a little later in this description when considering Figure 4.

When pickup head 19 reaches the end of each trace on the correction drum 13, the apparatus is arranged to disengage arm 33 from rod 34. Thereafter, arm 33 passes around pulley 31 and returns to pulley 32. Simultaneously, block 25 is returned to the opposite end of the guide rods 38 and 39 by the action of elastic member 65.

It is apparent that it would be inconvenient to start the apparatus in motion only after all of the aforesaid alignments and adjustments had been made. The value of the illustrated apparatus will be more greatly appreciated, then, when it is recognized that the drums and other operating mechanical parts can be continually kept in motion while the various adjustments for static and dynamic corrections are made. Thus, section drum 14 can be continually rotated without any danger of a record being made on this drum so long as switch 52 remains open. In practice it is this very technique which is employed, switch 52 being closed only when it is desired to make a record of a signal on drum 14.

To recapitulate briefly, the following steps are necessary in transposing information from record drum 12 to section drum 14. First, the various drums are properly aligned relative to one another and relative to the spread correction mechanism and are set in motion. Second, the static correction head 17 and the dynamic correction head 19 are arranged such that all contemplated corrections can be made without causing a collision of these heads and such that engagement of arm 33 and rod 34 occurs simultaneously with (1) the pickup of the shot break point of a trace by pickup head 19 and (2) projection of the point by the device 21 upon the section drum 14. Third, the projection device 21 is positioned in a desirable location along the length of the section drum 14 such that subsequent traces may be positioned in a correct geographical orientation with respect to one another. Fourth, the slit opening of device 21 is adjusted to give the desired width to the trace which is to be projected upon the drum, the width of the trace being related to the spread between the various geophones involved. Fifth, the erase oscillator 45 is started and switches 40, 51 and 52 closed. Sixth, when the selected trace on the record drum 12 has been completely transposed and corrected from this drum to drum 14, switch 52 is opened (preferably automatically) and arrangements are made to transpose another trace from the record drum to the section drum. This step necessitates moving the selector switch 40 to the proper magnetic head contact as well as moving the projection device 21 to a new location along the length of the drum 14. It further calls for the incorporation of any static or dynamic correction adjustments which must be made as well as adjustments in the width of the slits in the projection device 21. After all of these adjustments have been made, the next trace may be transposed. Similarly, after all of the traces in any given tape have been processed, a new tape may be placed on the record drum and incorporated within the corrected section in substantially the same manner.

Time lines are placed upon the record on the section drum by connecting driver 45 with a time line marker 22. Conveniently, a time line is recorded at every position on the section corresponding to a shot hole position, and one line of the series of time lines is made to coincide with the break point on the section.

Figure 5:
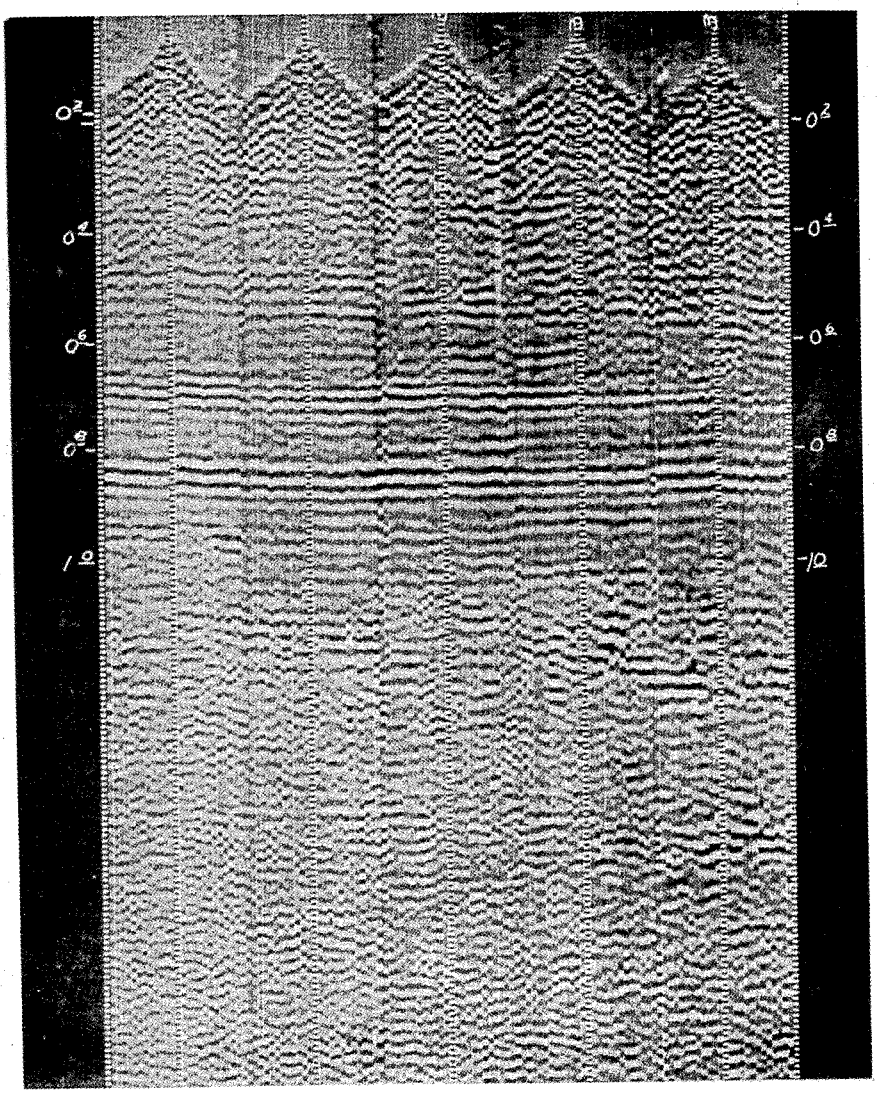
Figure 5 illustrates the type of results that are obtainable with the present invention.

In Figure 5 there is presented a set of records obtained by continuous profiling such as is produced by the apparatus of Figure 1. In examining these records it will be observed that they are of the variable density photographic type. It will further be observed that each separate trace is vertically disposed and that all of the traces are arranged in a side-by-side relation. The figure includes a total of about 120 such traces, representing some five observations. Each observation was obtained by locating the shot point substantially at the center point of a linear array of geophones. The arrays that were used in each observation adjoined one another and represent a section of the earth about 1.5 miles in total length—i. e. horizontally.

A scale has been included along each side of the figure to indicate the depths of the earth covered by the observation. This scale is expressed in terms of time in seconds, and the records indicate particularly strong reflections at times of about 0.7 second and 0.83 second. The datum level used for all of the traces is 4000 feet corresponding to zero on the time scale. It is particularly interesting to note that the records are far clearer and much easier to interpret than the usual "wiggly trace" records and that personal judgments which conventionally enter into the interpretation of records are greatly minimized by the present invention. Thus, the section that is presented in Figure 5 has been produced by applying procedures which utilize every bit of the original records and which require relatively no subjective opinions.

Figure 4:
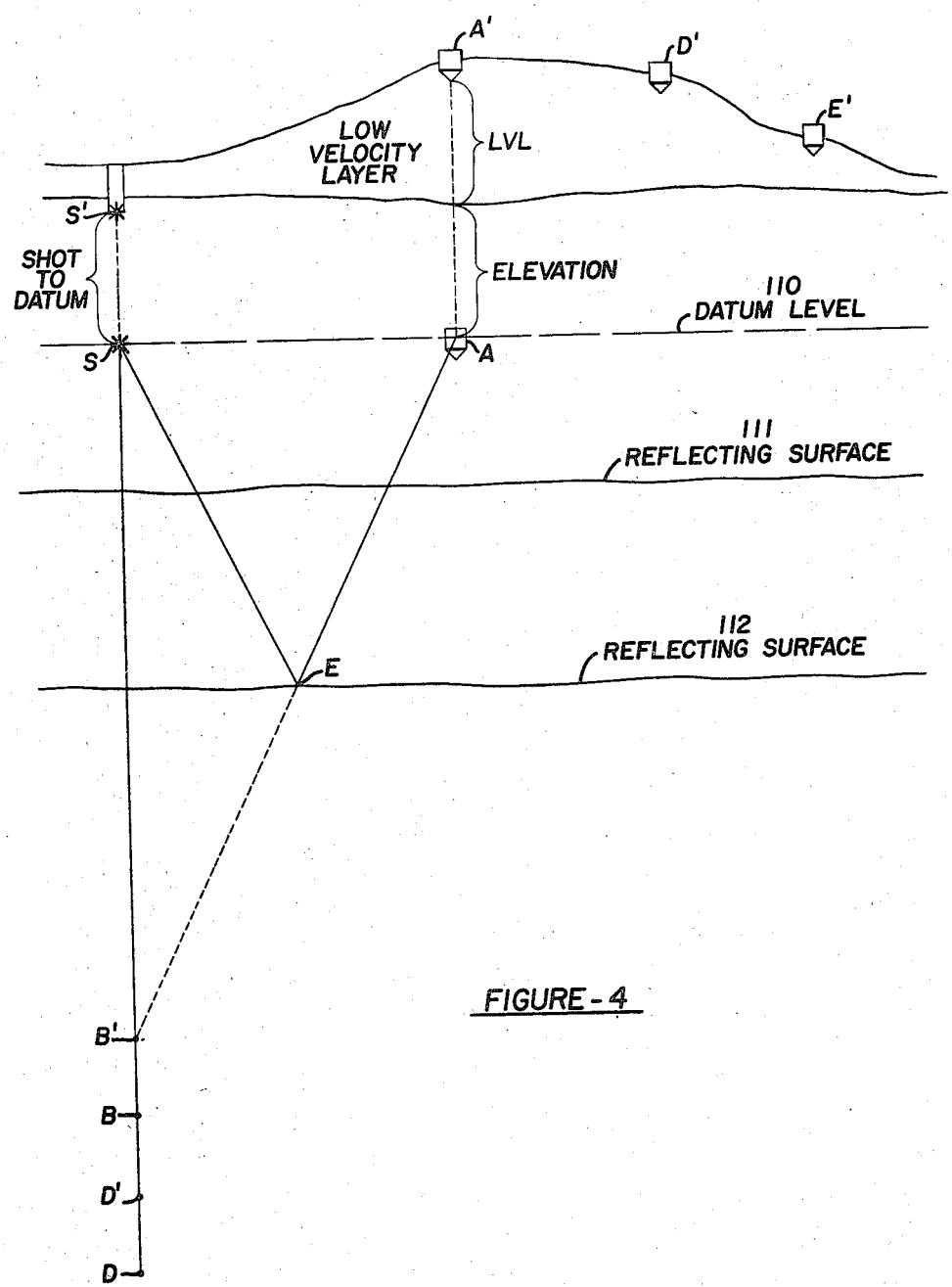
Figure 4 is a schematic representation illustrating the nature of the so-called "spread" correction and the manner in which this correction is made by the spread correction component of the present invention.

The fact that the spread correction mechanism 23 of Figure 1 is capable of continuously correcting for spread errors will be readily demonstrated by reference to Figure 4 which illustrates in cross-section a portion of the earth to be examined by means of a seismic observation. Turning to Figure 4, S' represents a shot point which is located at the bottom of a shot hole extending beneath the low velocity layer. Points A', D' and E' represent the locations of geophones which are disposed along the surface of the earth in a spaced relationship with respect to the shot point and also with respect to one another. Also illustrated in Figure 4 are an arbitrary datum elevation 110 and two reflecting surfaces 111 and 112.

Upon detonation of the shot at point S', the seismic wave travels downwardly through the earth and is reflected from surface 112 up to the various geophones. For the purposes of the present description, the reflection to be considered is the reflection which is transmitted to geophone A'.

Assuming the existence and use of suitable recording means, it will further be assumed that a certain time interval has been observed and determined for the arrival of a reflected seismic wave at geophone A' from the reflecting surface 112. With respect to this arrival time, it will immediately be obvious that this time cannot in itself be an accurate indication of the true depth of the reflecting surface 112. In the first place the point A' lies considerably above point S'; and secondly, there is substantial lateral distance between points S' and A'.

In arriving at the true depth of reflecting surface 112 it is conventional in the art to assume the existence of a convenient datum level, for example 110, and by suitable corrections in effect transfer the shot point S' to S by applying a "shot to datum" correction and the geophone A' to point A by applying an "LVL" correction and an "elevation" correction. All of these corrections are of a static or fixed nature.

Even though the shot point and the geophone point have now been transferred to the datum level 110, it is readily apparent that the time for a seismic wave to travel from point S to point E and thence to point A is not a direct measure of the true depth of point E below datum level 110. The true depth of point E beneath level 110 is actually one-half the distance SB'. Furthermore, as will be apparent from the geometric nature of the triangles illustrated in the figure, distance SB' is proportional to the true depth of point E and distance SEA or B'EA is proportional to the actual distance that the sound travels in passing from point S to point E and then to point A.

If a distance SB is laid off along the line SB' which is equal to the distance AEB', it will be apparent that the distance B'B is proportional to the difference between true depth of point E below level 110 and the actual distance traveled by the sound in moving from S to E to A. Expressed otherwise, the distance B'B is proportional to the error which is commonly referred to as the "spread" error in seismic calculations. Carried one step further, a distance D'D, which is equal to the distance B'B, may be measured off as indicated.

With the above relationships in mind, it will be seen that the lines SD or AB'D' may be considered to correspond to the length of the tape AD in Figure 1; and, furthermore, that the line AS may be considered to correspond to the displacement of point A along the longitudinal axis of the spread adjustment screw 27 in Figure 1. Accordingly, the distance by which the length of the tape 24 is moved or lengthened when point A is moved along the screw 27 is proportional to the spread correction which must be applied to the original traces on drum 12 in preparing the corrected seismic section on drum 14. It will be apparent, however, that the various apparatus components involved must be maintained in proper proportion in order that accurate results are obtained.

It will be appreciated that the spread correction which is indicated in Figure 4 may be made manually, so to speak, using conventional geometric and mathematical relationships and that the present invention constitutes an improved procedure for attaining the same objective. It will be recognized that the spread correction mechanism illustrated in Figure 1 is in essence an analog computer and continuously computes spread corrections. As mentioned earlier, the particular computer illustrated in the figure includes a metal tape and certain other mechanical components; and it constitutes a computer which is uniquely attractive in view of its simplicity, its ruggedness, its ready maintenance and its accuracy. It will be apparent to those skilled in the art, however, that other arrangements employing electrical circuits, cams, and the like may be constructed to afford similar results. The device, whatever it may be, need only be capable of solving the geometric problem which has been described at length earlier in this discussion. In short, then, the present invention in its scope and principle is much broader than the single embodiment illustrated in the figures; and a wide variety of suitable computers can be devised to attain the same objectives.

Closer examination of the invention and the above description readily reveal the fact that the invention is much broader in scope than the single embodiment which has been illustrated and described. Thus, it will be recognized that a plurality of record drums may be mounted on shaft 15, for example where it is desirable to superimpose traces from one observation upon the traces which are received during other observations. Furthermore, it will be recognized that the invention is readily adaptable to magnetic records other than those impressed on magnetic tape and also to records of variable density and variable area types.

It will further be recognized that materials other than photographic film may be mounted and utilized in preparing the seismic sections on the section drum 14 of Figure 1. Magnetic-type records, oscillographic trace records, "teledeltos"-type records and the like may be employed; although variable density type records are preferred—and especially variable density records of the photographic type. For the purposes of this invention, other types of variable density records or visual records are not equivalent to variable density records of the photographic type in view of the markedly superior sections which are obtained with the latter records. The type of projection device—i. e. member 21 in Figure 1—will, of course, be governed by the type of record material which is mounted upon drum 14. For example, a magnetic head should be employed for magnetic records, a pen for pen-and-ink records, etc.

It will likewise be apparent that more than one correction drum may be employed in conjunction with more than one projection device. Again, a wide variety of modulating, filtering, and amplifying circuits and the like may be employed in practicing the invention.

To summarize briefly, the present invention constitutes means for reproducing a set of seismic traces, trace-by-trace, which are obtained on an arrival time basis and for altering the relative positions of these traces to produce a seismic section. The traces are adjusted longitudinally relative to one another to refer them all to a common datum level; the traces are distorted by means of an analog computer to correct for spread and other dynamic errors; and the traces are spaced laterally in proportion to the lateral distances existing between the seismic transducers responsible for the original traces. In the reproduction step, the traces are reproduced to form electrical signals which are amplified, modulated, etc. as desired prior to incorporation within the section produced. The original records and the section are preferably mounted on rotatable drums; and each reproduced trace is preferably recorded on and again reproduced from a third drum whose recording means and reproduction means are movable relative to the drum to incorporate static and dynamic seismic corrections. Original records of the magnetic trace type and section records of the variable density, photographic type afford uniquely valuable features.

The invention preferably enters dynamic spread corrections into the seismic sections produced by the invention by means of an analog computer which utilizes mechanical components. As noted earlier, analog computers other than mechanical types may also be employed, but non-mechanical types present maintenance and operating problems which render them less preferred. As an example of an alternate type analog spread computer and corrector is one employing electrical circuitry providing an electrical signal which is proportional to the spread correction. This signal may be employed to actuate a servo-control mechanism which in turn may be arranged to control the relative positions of the various drums illustrated in Figure 1 to incorporate spread corrections within the traces on the section drum. Thus, a differential gear assembly may be interposed between the record drum and the section drum, the position of the differential gear and the resulting relative positions of the two drums being adjusted and maintained by the servo-control mechanism.

The static corrections that are employed in utilizing the invention may be obtained by any of the conventional mathematical or other procedures that are used in the art for this purpose. Similarly, while the present description has been directed primarily toward the solution of seismic problems involving substantially flat beds, it will be recognized that the invention may be readily adapted to the solution of problems involving dipping beds and the like.

A variety of time-line generating devices may be used in the practice of the invention other than the photoelectric device which is illustrated in Figure 1. As illustrated there, a suitable device consists of a radially slotted disc which is arranged to rotate in synchronism with the section drum past a light source. The slots in the rotating disc are spaced radially from one another by distances corresponding to predetermined time intervals on the section produced by the section drum. Thus, light which is transmitted from the light source through the slots in the disc falls upon a photoelectric cell to develop a plurality of time-spaced electrical signals which may be employed to actuate driver 45 through switches 51 and 52 to form a time-line record on the recording medium positioned on the section drum. Other well known apparatus and procedures may be adapted to serve this function for the invention.

It will be noted that the invention has particular application to continuous profiling procedures, but it may also be adapted to spot correlation shooting, dip shooting, cross-spread shooting, etc. It furthermore may be used with single or multiple shots.

The sections produced by the invention may be mounted on suitable backing material or supports and bent or assembled to form scale models of an area under investigation.

What is claimed is:

1. In the art of seismic prospecting wherein seismic waves are transmitted to the earth at a shot point and reflected seismic waves received at detection points laterally spaced from the shot point are translated by seismic transducers into trains of electrical signals which are recorded in arrival time relation as side-by-side traces on a reproducible recording medium, and wherein the resulting reproducible record includes a reference time trace, a shot time trace, and a separate trace indicating the arrival times of the reflected waves at each detection point; an improved apparatus for producing a corrected seismic section from the reproducible record which comprises a record drum arranged to hold said reproducible record; a correction drum having a magnetizable surface; a section drum; a visual-type record medium positioned on said section drum; means to rotate said record drum, said correction drum, and said section drum in synchronism; transducer means adjacent said record drum arranged to scan along the length of each reproducible trace and to generate a train of electrical signals in response to said trace; a recording head arranged to receive each said train of electrical signals from said transducer means and to form a magnetic trace on the surface of said correction drum; a playback head adjacent said correction drum in arcually spaced relation to said recording head and arranged to generate a second train of electrical signals in response to each said magnetic trace, a recording device adjacent said visual record medium on said section drum and adapted to form a visual trace on said visual record medium in response to each said second train of electrical signals, means to move said recording head arcually relative to said correction drum and also relative to said playback head prior to reproduction of any given reproducible trace on said record drum to correct the time of each seismic event in the trace to a predetermined datum elevation; analog computer means adapted to move said playback head arcually relative to said correction drum while generating each second train of electrical signals to correct the time of each seismic event in the corresponding magnetic trace for the lateral distance between said shot point and the corresponding detection point; and means for positioning the visual traces on the section drum laterally relative from one another distances proportional to the distaces between the corresponding detection points.

2. An apparatus for preparing a seismic section from a magnetic tape seismic record containing a plurality of seismic traces, said traces being generated by seismic transducers and being presented in a side-by-side relation and on an arrival-time basis which comprises in combination a record drum adapted to hold said tape, a correction drum having a magnetizable surface, a section drum adapted to hold a recording medium, means for revolving said drums in synchronism with one another, transducer means for separately scanning and reproducing each trace on the magnetic tape, recording means adjacent said correction drum for recording each reproduced trace as a magnetic trace around the surface of the correction drum, means for adjusting the position of said recording means around the surface of the correction drum to correct for static seismic errors in each recorded reproduced trace, pickup means for scanning and reproducing each trace from the surface of the correction drum, means for moving said pickup means relative to the recorded trace on the correction drum throughout the reproduction of the trace to correct the trace for dynamic seismic errors, means for recording each statically corrected and dynamically corrected trace in a side-by-side relation on said recording medium on said section drum, means for laterally spacing said corrected traces on said recording medium distances proportional to the lateral distances between the transducers corresponding to the traces.

3. In the art of seismic prospecting wherein a seismic disturbance is created at one point in the earth and the resulting seismic vibrations at spaced points along a line from the disturbance are translated by seismic transducers into trains of electrical signals and the trains are separately and simultaneously recorded as reproducible side-by-side traces on a magnetic recording medium, an apparatus for preparing a seismic profile of the earth based on the magnetic traces which comprises in combination a transducer head for separately and sequentially scanning and reproducing each magnetic trace, a rotatable correction drum have a magnetizable cylindrical surface, a recording head arranged to receive each reproduced trace and to record the trace on the surface of the correction drum, pickup means spaced along the surface of the correction drum from the recording head to pick up each trace recorded on the correction drum, a rotatable section drum, a visual recording medium positioned on the section drum and of a character to produce a permanent visual-type record, a recording device arranged to receive electrical signals from said pickup means and to record the resulting signals on said visual recording medium, means for proportioning the relative movement between said recording device and said visual recording medium to the relative movement between said transducer head and said magnetic recording medium, means for positioning said recording device along the longitudinal axis of said section drum to separate the visual traces recorded thereon from one another distances proportional to the lateral distances between the seismic transducers corresponding to the traces, means for changing the time phase relation of each magnetic trace on the correction drum relative to the corresponding trace on the magnetic recording medium to refer each trace to a common reference datum corresponding to a predetermined elevation of the earth, and means for changing the relative position between the recording head and the pickup means on the correction drum for each trace to correct the trace for dynamic seismic errors.

4. In the art of reflection-type seismic prospecting wherein a seismic impulse is introduced within the earth at a shot point, and seismic disturbances occasioned by subterranean reflections of the impulse are detected by a plurality of seismic transducers spaced from and arranged in a linear array with the shot point and wherein the impulse time and the arrival times of the reflected disturbances relative to the impulse are recorded in the form of side-by-side reproducible traces, each separate trace representing the reflected disturbances received by one of the transducers, an improved apparatus for translating the recorded reproducible traces into a corrected seismic section which comprises a cylindrical record drum arranged to receive said reproducible trace record, transducer means arranged to separately and electrically reproduce each reproducible trace at a predetermined scanning rate, a cylindrical correction drum, a recording head movable relative to the correction drum and arranged to record each reproducible trace as a magnetic trace around the surface of the correction drum, a pickup head movable relative to the correction drum and arranged to pick up each magnetic trace, a cylindrical section drum, a recording medium positioned on said section drum of a character to provide a permanent visual-type record, recording means movable relative to said section drum arranged to receive each picked-up magnetic trace and to record the trace as a visual-type trace on the recording medium, means to shift the recording means along the length of the section drum to record the visual traces in a laterally spaced relation which is proportional to the lateral spacings between the seismic transducers corresponding to the traces, means for recording each visual trace on the section drum at a rate proportional to the scanning rate of the corresponding reproducible trace on the record drum, means for displacing said recording head around the periphery of said correction drum a predetermined amount prior to the recording of each magnetic trace to refer each reflection arrival time on the trace to a common predetermined datum elevation, analog computing means to continuously determine the time interval occasioned by lateral travel of the seismic impulse from the shot point to each transducer for each travel time along the length of the magnetic trace corresponding to the transducer, and means for displacing the pickup head along the length of each magnetic trace in response to the time interval determined by said analog computer means to correct the picked-up trace for the lateral travel time interval.

5. An apparatus as defined in claim 4 in which the recording medium on the section drum is a photographic film and the recording means is a light source whose intensity of illumination is a function of the electrical signal supplied to the source.

6. An apparatus as defined in claim 4 in which the reproducible traces are magnetic traces.

7. An apparatus as defined in claim 4 in which the analog computer means is of a mechanical type.

8. An apparatus for preparing a seismic section from a reproducible uncorrected multi-trace seismic record obtained by imparting a seismic shock to the earth at a shot point and recording the reception of subterranean reflections of the shock in arrival time relation by means of seismic detectors positioned at points spaced from the shot point, which comprises in combination, a rotatable record drum adapted to receive the seismic record around its cylindrical surface, a correction drum having a magnetizable cylindrical surface, a section drum adapted to receive a recording medium around its cylindrical surface, means to rotate said record drum, said correction drum and said section drum in synchronism, transducer means adjacent said record drum adapted to sequentially and separately play back each trace of the seismic record, recording means adjacent said correction drum to receive each trace played back by said transducer means and to re-record the trace as a magnetic trace around the correction drum, means to adjust the position of said recording means around the surface of said correction drum, an erase head adjacent said correction drum and spaced from said recording means, playback means adjacent said correction drum adapted to play back each magnetic trace before erasure, said playback means being displaceable around said correction drum, a recording device adjacent said section drum and adapted to receive each magnetic trace played back by said playback means and to re-record the same as a trace around the section drum, said recording device being adjustable in position along the length of said section drum, analog computing means of a character to determine the spread corrections to be applied along the length of a seismic trace, the position of said playback means around said correction drum being responsive to said analog computing means to enter said corrections within each magnetic trace played back by said playback means.

9. An apparatus for preparing a seismic section from an uncorrected, multi-trace reproducible seismic record which comprises a rotatable record drum adapted to receive said record around its outer surface, a rotatable correction drum having a magnetizable cylindrical surface, a rotatable section drum adapted to receive a recording medium around its cylindrical surface, means to rotate said drums in synchronism, transducer means adjacent said record drum adapted to separately and sequentially play back the traces recorded on said record, a recording head adapted to receive each train of playback signals generated by the transducer means and to record the signals as a magnetic trace around the surface of the correction drum, trace erase means spaced along the surface of the correction drum from the recording head, a pickup head adjacent the surface of the correction drum to reproduce each magnetic trace prior to erasure by the erase head, said recording head being adjustable in position around the surface of the correction drum to refer all traces on said record to a common time datum, analog computer means for determining the time difference between each total time indicated along a seismic trace for a seismic wave to travel from a shot point via a subterranean reflecting surface to a seismic detector producing the trace and the total vertical travel time component of the wave, means responsive to said analog computer means to move the pickup head around the surface of the correction drum to convert said total times along each seismic trace to said vertical travel-time components, a recording device adjacent said section drum of a character to form a trace on the recording medium, said recording device being movable along the length of the section drum and adapted to receive signals generated by the pickup head.

10. An apparatus for preparing a corrected section from an uncorrected multi-trace reproducible seismic record which comprises a rotatable record drum adapted to receive said record around its cylindrical surface, a rotatable correction drum having a magnetizable surface, a rotatable section drum adapted to receive a recording medium around its cylindrical surface, means to rotate said drums in synchronism, means including playback means adjacent said record drum and recording means adjacent said correction drum to sequentially and separately reproduce each trace from said record and to re-record the trace as a magnetic trace around the surface of the correction drum, said recording means being adjustable in position around said correction drum to incorporate static seismic corrections in the magnetic traces, magnetic trace erase means adjacent said correction drum and spaced from said recording means, means including a pickup head adjacent said correction drum and a recording device adjacent said section drum to reproduce each magnetic trace on the correction drum before erasure and to re-record the trace on said recording medium, means including an analog spread correction computer for adjusting the position of said pickup head during the reproduction of each magnetic trace from the correction drum to incorporate spread corrections within the trace, said recording device being adjustable in position along the length of said section drum.

11. An apparatus as defined in claim 10 in which the recording medium is photographic in type and the recording device is a light source adapted to re-record each magnetic trace on the recording medium as a variable density photographic trace.

12. An apparatus as defined in claim 10 including means to adjust the width of each trace recorded on the recording medium.

References Cited in the file of this patent
UNITED STATES PATENTS

| | | |
|---|---|---|
| 2,440,971 | Palmer | May 4, 1948 |
| 2,620,890 | Lee et al. | Dec. 9, 1952 |
| 2,732,025 | Lee | Jan. 24, 1956 |

OTHER REFERENCES

Begun: "Magnetic Tape Improves Geophysical Recordings," Electronics Magazine, January 1955, pp. 152–155.